(12) United States Patent
Casagrande

(10) Patent No.: US 12,276,740 B2
(45) Date of Patent: Apr. 15, 2025

(54) METHOD FOR THE LOCATION OF A BEACON BY ANGLES OF ARRIVAL

(71) Applicant: The Swatch Group Research and Development Ltd., Marin (CH)

(72) Inventor: Arnaud Casagrande, Bole (CH)

(73) Assignee: The Swatch Group Research and Development Ltd, Marin (CH)

( * ) Notice: Subject to any disclaimer, the term of this patent is extended or adjusted under 35 U.S.C. 154(b) by 326 days.

(21) Appl. No.: 15/772,856

(22) PCT Filed: Oct. 21, 2016

(86) PCT No.: PCT/EP2016/075444
§ 371 (c)(1),
(2) Date: May 2, 2018

(87) PCT Pub. No.: WO2017/084834
PCT Pub. Date: May 26, 2017

(65) Prior Publication Data
US 2018/0329016 A1 Nov. 15, 2018

(30) Foreign Application Priority Data
Nov. 18, 2015 (EP) .................................... 15195139

(51) Int. Cl.
*G01S 3/04* (2006.01)
*G01S 3/48* (2006.01)
(Continued)

(52) U.S. Cl.
CPC ................ *G01S 3/043* (2013.01); *G01S 3/04* (2013.01); *G01S 3/48* (2013.01); *G01S 5/0226* (2013.01); *G01S 5/04* (2013.01)

(58) Field of Classification Search
None
See application file for complete search history.

(56) References Cited

U.S. PATENT DOCUMENTS

| 5,592,180 | A | 1/1997 | Yokev et al. |
| 7,432,857 | B2 * | 10/2008 | Yamamoto ................ G01S 3/30 342/374 |

(Continued)

FOREIGN PATENT DOCUMENTS

| CN | 1200811 A | 12/1998 |
| CN | 1444413 | 9/2003 |

(Continued)

OTHER PUBLICATIONS

Andersen, Jorgen et al. "Propagation Measurements and Models for Wireless Communications Channels." IEEE Communications Magazine. Jan. 1995. pp. 42-49 (Year: 1995).*

(Continued)

*Primary Examiner* — Whitney Moore
(74) *Attorney, Agent, or Firm* — Oblon, McClelland, Maier & Neustadt, L.L.P.

(57) ABSTRACT

A method for location of a beacon includes: executing R sequences, wherein R is a whole number equal to or greater than 2, each including reception by a first antenna network and a second antenna network of a signal originating from the beacon, wherein the signals of the R sequences are of different wavelengths; calculating a first estimation function for angles of arrival of the signal on the first antenna network and of a second estimation function for angles of arrival of the signal on the second antenna network; and executing a mutual correlation of the R first estimation functions and the R second estimation functions, for the respective determination of a first angle between the beacon and the first network, and of a second angle between the beacon and the second network.

2 Claims, 4 Drawing Sheets

(51) Int. Cl.
*G01S 5/02* (2010.01)
*G01S 5/04* (2006.01)

(56) References Cited

U.S. PATENT DOCUMENTS

| | | | | |
|---|---|---|---|---|
| 7,495,614 | B2* | 2/2009 | Small | G01S 5/0215 |
| | | | | 342/458 |
| 7,800,541 | B2* | 9/2010 | Moshfeghi | G01S 5/14 |
| | | | | 342/465 |
| 8,116,350 | B1* | 2/2012 | Arndt | G01S 5/12 |
| | | | | 342/126 |
| 8,207,892 | B2* | 6/2012 | Abbasfar | H04B 7/086 |
| | | | | 342/414 |
| 8,797,213 | B2* | 8/2014 | Pun | G01S 3/48 |
| | | | | 342/442 |
| 9,178,277 | B1* | 11/2015 | Moretti | H01Q 3/34 |
| 9,606,213 | B2* | 3/2017 | Meiman | G01S 3/46 |
| 2003/0002471 | A1* | 1/2003 | Crawford | H04B 17/336 |
| | | | | 370/343 |
| 2003/0048224 | A1 | 3/2003 | Banner et al. | |
| 2008/0204310 | A1 | 8/2008 | Blessing et al. | |
| 2010/0259450 | A1* | 10/2010 | Kainulainen | G01S 5/02 |
| | | | | 342/417 |
| 2012/0276921 | A1 | 11/2012 | Nemeth | |
| 2013/0315353 | A1 | 11/2013 | Belloni et al. | |
| 2014/0269389 | A1 | 9/2014 | Bukkfejes et al. | |
| 2015/0234033 | A1* | 8/2015 | Jamieson | G01S 5/04 |
| | | | | 455/456.1 |
| 2015/0304979 | A1* | 10/2015 | Kumar | G01S 3/46 |
| | | | | 455/456.1 |
| 2016/0187451 | A1 | 6/2016 | Meiman | |
| 2017/0131335 | A1* | 5/2017 | Pratt | H04B 7/10 |

FOREIGN PATENT DOCUMENTS

| | | |
|---|---|---|
| CN | 1739221 A | 2/2006 |
| CN | 102413563 A | 4/2012 |
| CN | 102882670 | 1/2013 |
| CN | 104135305 A | 11/2014 |
| JP | 2001-281316 | 10/2001 |
| JP | 2006-053088 | 2/2006 |
| JP | 2006-258637 | 9/2006 |
| WO | WO 2015/019354 A1 | 2/2015 |

OTHER PUBLICATIONS

Jain, Raj. "Introduction to Wireless Signal Propagation." https://www.cse.wustl.edu/~jain/cse574-14/ftp/j_04wsp.pdf. Washington University in St. Louis. 2014. pp 1-32. (Year: 2014).*

Mark Curry, et al., "Indoor Angle of Arrival Using Wide-Band Frequency Diversity with Experimental Results and EM Propagation Modeling," Antennas and Propagation for Wireless Communications, Nov. 6, 2000, XP010530162, pp. 65-68.

International Search Report issued May 15, 2017 in PCT/EP2016/075444 filed Oct. 21, 2016.

Combined Chinese Office Action and Search Report issued Jun. 21, 2021 in corresponding Chinese Patent Application No. 201680067185.5 (with English Translation and English Translation of Category of Cited Documents), 15 pages.

Chinese Office Action issued Feb. 7, 2022 in Chinese Application No. 201680067185.5 (with computer generated English translation).

Chinese Office Action issued Feb. 7, 2022 in Chinese Application No. 201680067185.5 (with computer generated English translation, references AO-AS and AX-AY cited therein).

Sharan et al. "Localization of Acoustic Beacons using Iterative Null Beamforming over Ad-hoc Wireless Sensor Networks", IEEE, 2013 Asilomar Conference on Signals, System and Computers, May 8, 2014, pp. 542-546.

Combined Chinese Office Action and Search Report issued Jun. 21, 2021 in corresponding Chinese Patent Application No. 201680067185.5 (with English Translation and English Translation of Category of Cited Documents) citing documents AA, AB, AO-AR and AX-AZ therein, 15 pages.

Xia Zhenjie et al., "A Localization Scheme with Mobile Beacon for Wireless Sensor Networks", 2006 6th International Conference on ITS Telecommunications Proceedings, pp. 1017-1020.

Richard K. Martin et al., "Bandwidth Efficient Cooperative TDOA Computation for Multicarrier Signals of Opportunity", IEEE Transactions On Signal Processing, vol. 57, No. 6, Jun. 2009, pp. 2311-2322.

Yang Liu, "Study of Linearity Localization Method", with English Abstract, Oct. 15, 2011, 67 pages.

* cited by examiner

METHOD FOR THE LOCATION OF A BEACON BY ANGLES OF ARRIVAL

FIELD OF THE INVENTION

The invention relates to the technical field of devices and methods for the location of beacons. Any device which is employed for the purposes of location, and is locatable and identifiable by appropriate means, may be called a beacon.

PRIOR ART

The location of a beacon by the calculation of directions of propagation of a radio-frequency signal originating from the beacon and incident on at least two antenna networks is known. This technique is known as the angle of arrival location method. In this context, numerous algorithms have been developed for the estimation of an angle of arrival of a signal on an antenna network. More precisely, these algorithms enable to calculate functions associating probabilities with angles of arrival of the signal on the antenna network.

For example, the "MUSIC" (abbreviation of "Multiple Signal Classification") algorithm is known, described by R. O. Schmidt in the article "Multiple emitter location and signal parameter estimation", IEEE Trans. Antennas & Propagation, vol. 34, no. 3, March 1986. This algorithm permits a high degree of spatial resolution, and is relatively simple to deploy, but is particularly complex in terms of calculations. The "Beamforming Spatial Filtering" algorithm is also known, described by Barry D. Van Veen and Kevin M. Buckley in the article "Beamforming: A Versatile Approach to Spatial Filtering", IEEE ASSP magazine April 1988. This algorithm permits a significantly lower degree of resolution than the MUSIC algorithm, but is less complex in terms of calculations.

The angle of arrival location technique is particularly appropriate for open environments, in which the signal primarily follows direct paths between the beacon and the antenna networks. However, this technique is restricted in interior locations, in which the wave then employs multiple paths, specifically as a result of reflections on surrounding disruptive elements. The estimation function for angles of arrival thus incorporates a plurality of spikes, the assignment of which to either a direct path or to a path generated by reflections is difficult.

SUMMARY OF THE INVENTION

The invention therefore proposes a method for location by angles of arrival, which is effective in an environment featuring numerous reflective elements.

To this end, the invention proposes a method for the location of a beacon, comprising:
R sequences, where R is a whole number equal to or greater than 2, each comprising:
Reception by a first antenna network and a second antenna network of a signal originating from the beacon, wherein the signals of the R sequences are of different wavelengths,
Calculation of a first estimation function for angles of arrival of the signal on the first antenna network and of a second estimation function for angles of arrival of the signal on the second antenna network,
Mutual correlation of the R first estimation functions and of the R second estimation functions, for the respective determination of a first angle between the beacon and the first network, and of a second angle between the beacon and the second network.

The invention exploits the following observation: the reflected power of an incident signal on a reflective element is dependent upon the discrepancy between the wavelength of the signal and the dimensions of said element. More specifically, the closer the dimensions of the element to the wavelength of the signal, the greater the reflected power. The reflective element thus assumes the role of a secondary antenna, which retransmits the incident signal. Accordingly, by selecting wavelengths for the signals emitted by the beacon which are close to the typical dimensions of the reflective elements in the environment in which the method is deployed, a strong reflection of the various signals from the reflective elements can be ensured. In other words, the signals emitted by the beacon do not reflect as strongly on the various reflectors.

Yet an estimation function for angles of arrival of a signal on an antenna network, i.e. a function for the association of probabilities with angles of arrival of the signal on said network, not only incorporates a probability spike for the angle corresponding to the direct transmission path between the beacon and said network, but also probability spikes for angles corresponding to paths generated by reflections from reflective elements in the environment in which the beacon is located. Accordingly, all of the R first estimation functions incorporate a probability spike for a specific angle—the angle corresponding to the direct transmission path, described as the first angle—and probability spikes for different angles, as a function of wavelengths. Correlation of the R first estimation functions therefore permits the discrimination of the angle corresponding to the direct transmission path. Likewise, all of the R second estimation functions incorporate a probability spike for a specific angle—the angle corresponding to the direct transmission path, called second angle—and probability spikes for different angles, as a function of wavelengths. Correlation of the R second estimation functions therefore permits the discrimination of the angle corresponding to the direct transmission path.

In addition to the above-mentioned characteristics, the method according to the invention can incorporate one or more of the following complementary characteristics, considered individually or in any technically feasible combination.

In one non-limiting form of embodiment, a sequence comprises an acquisition step for the signal, by each receiver of the first receivers connected to first sensors in the first antenna network. Moreover, at least one acquisition executed by a first receiver comprises a first phase for the acquisition of the signal captured by one of the sensors in a pair of first sensors, followed by a second phase for the acquisition of the signal captured by the other sensor of said pair.

In one non-limiting form of embodiment, a sequence comprises an acquisition step for the signal by each receiver of the second receivers connected to second sensors in the second antenna network. Moreover, at least one acquisition executed by a second receiver comprises a first phase for the acquisition of the signal captured by one of the sensors in a pair of second sensors, followed by a second phase for the acquisition of the signal captured by the other sensor of said pair.

In these two forms of embodiment, at least one receiver is associated with a pair of sensors. During a first phase, the receiver acquires the signal captured by one of the sensors of the pair of sensors; during a second phase, the receiver acquires the signal captured by the other sensor of the pair of sensors. If these two acquisitions are completed within a very short mutual time interval, it is possible to assume that the position of the beacon is substantially constant between the two acquisitions. The receiver is therefore mutualized, thus permitting the reduction of the total number of receivers required for the location of the beacon. Indeed, according to the prior art, one receiver per sensor is employed. According to the invention, a reduced number of receivers thus execute acquisitions simultaneously, thereby resulting in a reduction of the instantaneous power which is required during an acquisition phase. Naturally, the greater the number of mutualized receivers, the lower the instantaneous power required.

In one non-limiting form of embodiment, the signal captured by at least one first sensor is acquired during a first acquisition phase and during a second acquisition phase.

In one non-limiting form of embodiment, the signal captured by at least one second sensor is acquired during a first acquisition phase and during a second acquisition phase.

The incident signal on at least one sensor is thus simultaneously acquired during the first acquisition phase and during the second acquisition phase. Moreover, the signal is advantageously acquired by the same receiver. This permits the correct correlation of the acquisitions executed during the first phase and the acquisitions executed during the second phase.

In one non-limiting form of embodiment, the correlation of the R first estimation functions comprises a calculation, for each angle of a plurality of angles, of a mean for the probabilities associated with said angle by said R first estimation functions, wherein the angle with the highest mean is the angle between the beacon and the first network, i.e. the first angle.

In one non-limiting form of embodiment, the correlation of the R second estimation functions comprises a calculation, for each angle of a plurality of angles, of a mean for the probabilities associated with said angle by said R second estimation functions, wherein the angle with the highest mean is the angle between the beacon and the second network, i.e. the second angle.

A simple means is thus provided for calculating the angle which corresponds to the direct transmission path: the angle corresponding to the direct transmission path is the only angle with a high mean probability given that, for this angle, a probability spike is present on the estimation functions.

In one non-limiting form of embodiment, acquisition by a first receiver comprises the following:
Estimation of a frequency drift between said first receiver and the beacon,
Generation of a vector comprising a phase and amplitude of the signal received by a first sensor connected to said first receiver, by means of the drift estimated,
wherein the vectors are employed for the calculation of the estimation functions.

In one non-limiting form of embodiment, acquisition by a second receiver comprises the following:
Estimation of a frequency drift between said second receiver and the beacon,
Generation of a vector comprising a phase and amplitude of the signal received by a second sensor connected to said second receiver, by means of the estimated drift,
wherein the vectors are employed for the calculation of the estimation functions.

These two forms of embodiment are particularly advantageous where an algorithm of the Beamforming Spatial Filtering type, as described above, is deployed for the calculation of the estimation functions for angles of arrival. The parameters required by this algorithm are in fact the phase and amplitude vectors of the incident signals on the sensors of an antenna network. The phases and amplitudes are calculated, for example, using the frequency spectra for the phase and amplitude of the signals received. Yet, it is important to distinguish the signals from noise in these frequency spectra, in order to identify the characteristic rays of the signals emitted by the beacon. Identification of the frequency drifts between the receivers and the beacon (emitter of the signals) permits the accurate identification of these rays. Identification of the frequency drifts moreover permits the filtering-out of noise from the signals received, by application to the signals received of appropriate narrow band-pass filters. This information is also highly useful where the MUSIC algorithm, as described above, is employed, and the signal transmitted by the beacon is not modulated (pure carrier signal). Narrow-band filtering permits the elimination of any broadband noise (which is non-correlated, and thus a source of calculation error), and the retention of only useful information (the various phases and amplitudes of versions of the pure carrier signal obtained on the antennae).

In one non-limiting form of embodiment, the method comprises the location of the beacon from the first angle and the second angle.

The invention further comprises a device for the location of a beacon, comprising:
A first antenna network and a second antenna network, configured for the reception of R signals with distinct carrier frequencies, originating from the beacon,
Acquisition and calculation means which are configured:
for the calculation of estimation functions for the angles of arrival of the signals on the first antenna network and on the second antenna network,
for the correlation of the estimation functions, in order to determine a first angle between the beacon and the first network, and a second angle between the beacon and the second network.

In addition to the above-mentioned characteristics, the device according to the invention can incorporate one or more of the following complementary characteristics, considered individually or in any technically feasible combination.

In one non-limiting form of embodiment, the acquisition and calculation means comprise the following:
first receivers connected to first sensors on the first antenna network, configured for the acquisition of the signals captured by the first sensors to which they are connected,
at least one switch for the connection of a first receiver to one of the sensors of a pair of first sensors during a first phase for the acquisition of a signal, and to the other sensor of said pair during a second phase for the acquisition of said signal.

In one non-limiting form of embodiment, the acquisition and calculation means comprise the following:
second receivers connected to second sensors on the second antenna network, configured for the acquisition of the signals captured by the second sensors to which they are connected,
at least one switch for the connection of a second receiver to one of the sensors of a pair of second sensors during a first phase for the acquisition of a signal, and to the other sensor of said pair during a second phase for the acquisition of said signal.

In one non-limiting form of embodiment, the acquisition and calculation means are configured for the calculation, for each angle of a plurality of angles, of a mean for the probabilities associated with said angle by estimation functions, and for the selection of the angle which shows the highest mean.

In one non-limiting form of embodiment, the acquisition and calculation means are configured:
for the estimation of a frequency drift between a first receiver and the beacon,
for the generation of vectors, wherein each vector comprises a phase and amplitude of a signal received by a first sensor which is connected to the first receiver, by means of the estimated drift between said first receiver and the beacon.

In one non-limiting form of embodiment, the acquisition and calculation means are configured:
for the estimation of a frequency drift between a second receiver and the beacon,
for the generation of vectors, wherein each vector comprises a phase and amplitude of a signal received by a second sensor which is connected to the second receiver, by means of the estimated drift between said second receiver and the beacon.

In one non-limiting form of embodiment, the acquisition and calculation means are configured for the location of the beacon from the first angle and the second angle.

Understanding of the invention and the various applications thereof will be clarified by reading the following detailed description, and by an examination of the accompanying figures.

BRIEF DESCRIPTION OF THE DRAWINGS

The purposes, advantages and characteristics of the method and device for the location of a beacon will be clarified by the following description, based upon the non-limiting forms of embodiment illustrated by the drawings, in which.

DETAILED DESCRIPTION OF THE INVENTION

The object of the invention is the location of a beacon X in an environment which features a plurality of reflective elements, four of which being represented, for exemplary purposes, by reference symbols $P_{11}$, $P_{12}$, $P_{21}$ and $P_{22}$. In any environment, the reflective elements may be of different dimensions, as illustrated in FIG. 1.

The beacon X is configured to emit R signals $(Sg_i)_{i=1 \ldots R}$ of distinct wavelengths $(\lambda_i)_{i=1 \ldots R}$, where R is a whole number equal to or greater than 2. In the interests of clarity, only two signals $Sg_1$ and $Sg_2$, of respective wavelengths $\lambda_1$ and $\lambda_2$, are represented in FIG. 1. The signals $(Sg_i)_{i=1 \ldots R}$ emitted by the beacon X are reflected to a varying degree from the reflective elements, according to their wavelength. A disruptive element of dimensions close to the wavelength of a given signal will in fact specifically reflect said signal, but will only reflect a signal of a wavelength which differs substantially from its dimensions to a limited extent. Naturally, the dimensions of an element thus described are those of the surface of the element upon which the signal is incident.

Figure 1:
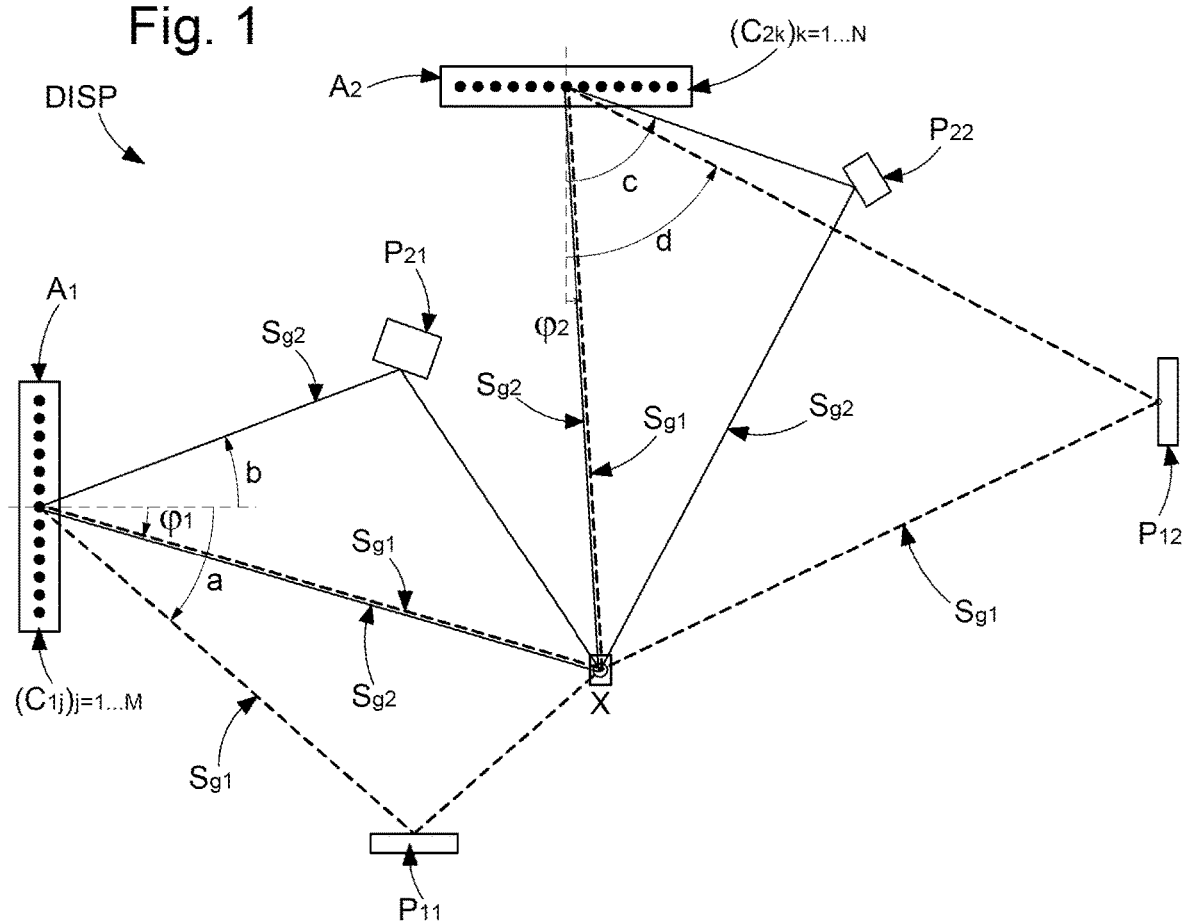
FIG. 1 shows a schematic representation of a device for the location of a beacon according to one form of embodiment of the invention, comprising a first and a second antenna network.

Thus, in the example represented in FIG. 1:
The reflective elements $P_{11}$ and $P_{12}$ strongly reflect the first signal $Sg_1$, but only weakly reflect the second signal $Sg_2$. The reflections of the second signal $Sg_2$ from the reflective elements $P_{11}$ and $P_{12}$ are thus ignored.
The reflective elements $P_{21}$ and $P_{22}$ strongly reflect the second signal $Sg_2$, but only weakly reflect the first signal $Sg_1$. The reflections of the first signal $Sg_1$ from the reflective elements $P_{21}$ and $P_{22}$ are thus ignored.

A device DISP according to the invention permits the location of the beacon X. The device DISP specifically comprises:
A first antenna network $A_1$ comprising M sensors $(C_{1j})_{j=1 \ldots M}$, where M is a whole number equal to or greater than 2.
A second antenna network $A_2$ comprising N sensors $(C_{2k})_{k=1 \ldots N}$, where N is a whole number equal to or greater than 2.

Where they propagate in a direct path between the beacon X and the first antenna network $A_1$, the first signal $Sg_1$ and the second signal $Sg_2$ are incident on the first antenna network $A_1$ according to a first angle $\varphi_1$. Where they propagate in a direct path between the beacon X and the second antenna network $A_2$, the first signal $Sg_1$ and the second signal $Sg_2$ are incident on the second antenna network $A_2$ according to a second angle $\varphi_2$. A direct path is understood as a path upon which no obstacle is located.

Moreover:
The first signal $Sg_1$ is incident on the first antenna network $A_1$ according to an angle a, where it is reflected from the reflective element $P_{11}$.
The second signal $Sg_2$ is incident on the first antenna network $A_1$ according to an angle b, where it is reflected from the reflective element $P_{21}$.
The first signal $Sg_1$ is incident on the second antenna network $A_2$ according to an angle c, where it is reflected from the reflective element $P_{12}$.
The second signal $Sg_2$ is incident on the second antenna network $A_2$ according to an angle d, where it is reflected from the reflective element $P_{22}$.

The device DISP also comprises acquisition and calculation means (not represented in FIG. 1), comprising two units, each of which is connected to an antenna network $A_1$, $A_2$. An acquisition and calculation unit permits the calculation, for a given signal, of the probabilities of the angle of incidence of the signal on the antenna network to which it is connected. Naturally, as a result of reflective phenomena, a number of angles will have high probabilities of incidence.

Figure 2:
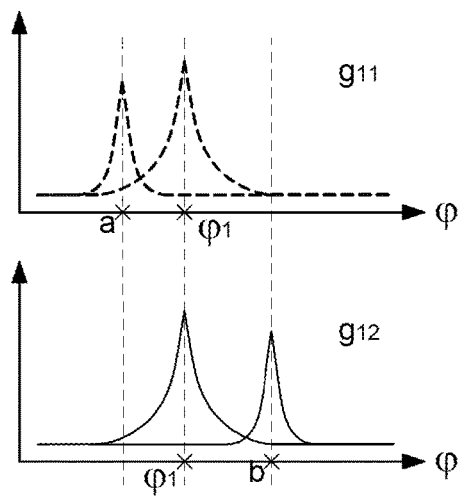
FIG. 2 shows a graph of two first estimation functions for angles of arrival of signals emitted by the beacon and incident on the first antenna network.
Figure 3:
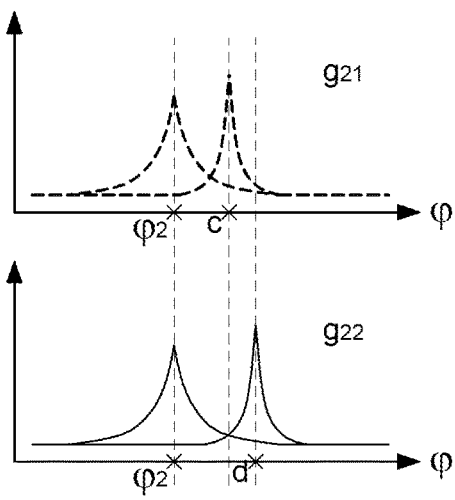
FIG. 3 shows a graph of two second estimation functions for angles of arrival of signals emitted by the beacon and incident on the second antenna network.

FIGS. 2 and 3 illustrate estimation functions for angles of incidence. In the upper part of FIG. 2, an estimation function $g_{11}$ is represented for angles of arrival of the first signal $Sg_1$ on the first antenna network $A_1$. It will be observed that the estimation function $g_{11}$ features two spikes: a first spike for angle a, corresponding to the reflected path of the first signal $Sg_1$ from the reflective element $P_{11}$; a second spike for the first angle $\varphi_1$, corresponding to the direct path of the first signal $Sg_1$ between the beacon X and the first antenna network $A_1$.

In the lower part of FIG. 2, an estimation function $g_{12}$ is represented for angles of arrival of the second signal $Sg_2$ on the first antenna network $A_1$. It will be observed that the estimation function $g_{12}$ features two spikes: a first spike for the first angle $\varphi_1$, corresponding to the direct path of the second signal $Sg_2$ between the beacon X and the first antenna network $A_1$; a second peak for angle b, corresponding to the reflected path of the second signal $Sg_2$ from the reflective element $P_{21}$.

In the upper part of FIG. 3, an estimation function $g_{21}$ is represented for angles of arrival of the first signal $Sg_1$ on the second antenna network $A_2$. It will be observed that the estimation function $g_{21}$ features two spikes: a first spike for the second angle $\varphi_2$, corresponding to the direct path of the first signal $Sg_1$ between the beacon X and the second antenna network $A_2$; a second spike for angle c, corresponding to the reflected path of the first signal $Sg_1$ from the reflective element $P_{12}$.

In the lower part of FIG. 3, an estimation function $g_{22}$ is represented for angles of arrival of the second signal $Sg_2$ on the second antenna network $A_2$. It will be observed that the estimation function $g_{22}$ features two spikes: a first spike for the second angle $\varphi_2$, corresponding to the direct path of the second signal $Sg_2$ between the beacon X and the second antenna network $A_2$; a second spike for angle d, corresponding to the reflected path of the second signal $Sg_2$ from the reflective element $P_{22}$.

Accordingly, the estimation functions $g_{11}$ and $g_{12}$ both feature a spike for the first angle $\varphi_1$, whereas the estimation functions $g_{21}$ and $g_{22}$ both feature a spike for the second angle $\varphi_2$. Thus, by correlating the estimation functions $g_{11}$ and $g_{12}$, and respectively the estimation functions $g_{21}$ and $g_{22}$, it is possible to determine the first angle $\varphi_1$, and respectively the second angle $\varphi_2$.

Figure 4:
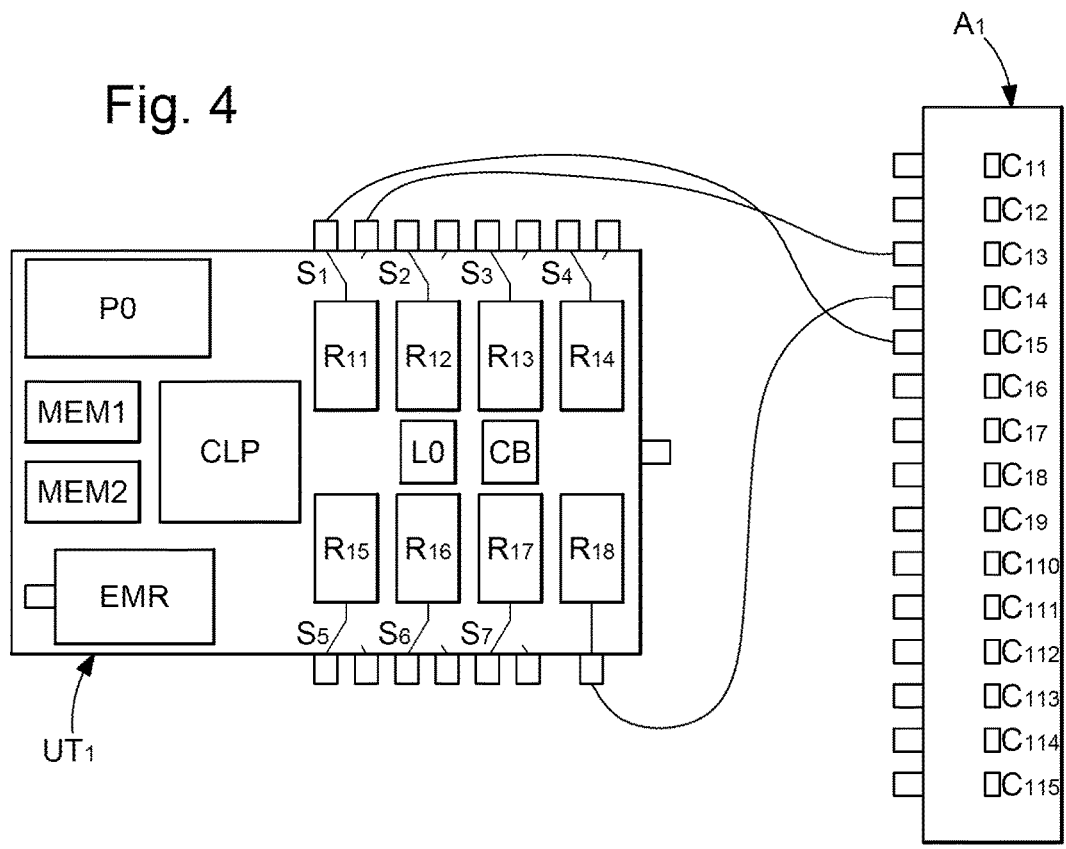
FIG. 4 shows a schematic representation of the first antenna network and of an acquisition and calculation unit connected to said first network.

FIG. 4 represents the first antenna network $A_1$ and a first acquisition and calculation unit $UT_1$ connected to said first network $A_1$. In the example represented in FIG. 4, the first antenna network $A_1$ comprises 15 first sensors $(C_{1j})_{j=1\ldots 15}$, and the first unit $UT_1$ comprises 8 first receivers $(R_{1p})_{p=1\ldots 8}$. More generally, the first unit $UT_1$ comprises S first receivers $(R_{1p})_{p=1\ldots S}$, where S is a whole number equal to or greater than 2, such that M=2S-1.

The antenna network $A_1$ comprises one connector, for example of the SMA type, per sensor $C_{1j}$. The unit $UT_1$ further comprises two connectors and one switch $S_p$ per receiver $R_{1p}$, with the exception of one receiver (the $8^{th}$ receiver $R_{18}$ in the example represented in FIG. 4) which is only associated with a single connector. Accordingly, each receiver $R_{1p}$ is capable of being connected in an alternating manner to two different sensors $C_{1j}$ via its associated switch $S_p$, with the exception of one of the receivers $R_{18}$. From FIG. 4, it will be observed that only three wired links are represented: the connectors of the $1^{st}$ receiver $R_{11}$ are shown connected to the connector of the $3^{rd}$ sensor $C_{13}$ and to the connector of the $5^{th}$ sensor $C_{15}$; the connector of the $8^{th}$ receiver $R_{18}$ is shown connected to the connector of the $4^{th}$ sensor $C_{14}$.

Figure 5:
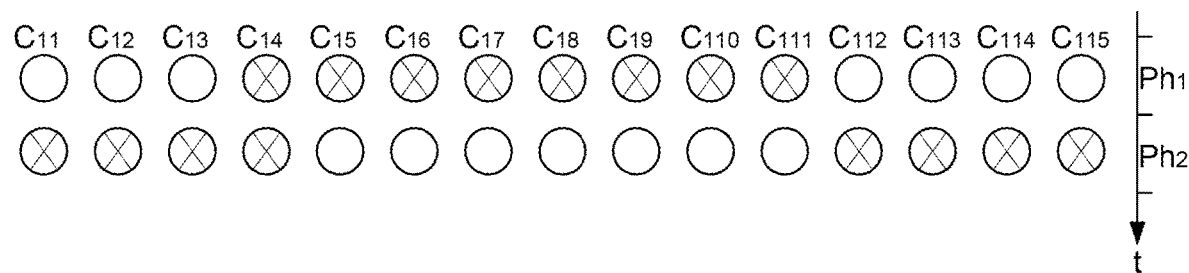
FIG. 5 shows a schematic representation of the first antenna network during a first acquisition phase and a second acquisition phase.

FIG. 5 represents the states of the 15 first sensors $(C_{1j})_{j=1\ldots 15}$ in FIG. 4 during two acquisition phases. In a first acquisition phase Ph1, the switches $(S_p)_{p=1\ldots 7}$ are in the state represented in FIG. 3, and the sensors connected to receivers are thus the sensors 4 to 11. In a second acquisition phase Ph2, the position of the switches $(S_p)_{p=1\ldots 7}$ is modified, and the sensors connected to receivers are thus the sensors 1 to 4 and 12 to 15. It will be observed that the $4^{th}$ sensor $C_{14}$ is connected to the $8^{th}$ receiver $R_{18}$ during both the acquisition phases Ph1, Ph2.

The unit $UT_1$ also comprises a local oscillator LO, which is capable of delivering a frequency $f_p$ to the first receivers $(R_{1p})_{p=1\ldots 8}$. Indeed, where a sensor $C_{1j}$ captures a signal $Sg_i$ of frequency $f_i$ originating from the beacon X, said signal $Sg_i$ undergoes the following processing in the receiver $R_{1p}$ which is connected to the sensor $C_{1j}$. Firstly, the signal $Sg_i$ is mixed in parallel with two quadrature signals at a frequency $f_p$ to obtain components at frequencies $f_i$, $f_p$ and $f_i+f_p$, and a component at an "intermediate" frequency $|f_i-f_p|$. Thereafter, a polyphase filter only permits the passage of the component at the intermediate frequency, which is lower than the initial frequency $f_i$ of the signal $Sg_i$. Finally, this low-frequency component undergoes analog-to-digital conversion.

The unit $UT_1$ also incorporates memories MEM1, MEM2, for the storage of the samples generated by the first receivers $(R_{1p})_{p=1\ldots 8}$, and a port PO, for example of the USB type, for the retrieval of the samples stored in the memories MEM1, MEM2. The unit $UT_1$ also comprises calibration means CB for the acquisition channels, in order to standardize the acquisitions executed by the various receivers $(R_{1p})_{p=1\ldots 8}$.

The unit $UT_1$ also comprises an emitter-receiver EMR which is capable of communicating with the beacon X, such that the receivers $(R_{1p})_{p=1\ldots 8}$ only acquire the signals $(Sg_i)_{i=1\ldots R}$ originating from the beacon X at the time of transmission thereof by the beacon X, rather than continuously, which would be an exceptionally energy-consuming arrangement. The beacon X transmits, for example, signals $(Sg_i)_{i=1\ldots R}$ in response to a query from the emitter-receiver EMR, or assumes the initiative and notifies the emitter-receiver EMR to this effect.

The unit $UT_1$ also comprises a programmable logic circuit PLC, for example of the FPGA type (Field-Programmable Gate Array), for the control of the other components of the unit $UT_1$.

Naturally, in a non-limiting form of embodiment, all the above-mentioned elements described with reference to the first antenna network $A_1$ can be transposed to the second antenna network $A_2$. A second acquisition and calculation unit (not represented in the figures) is connected to the second network $A_2$, wherein said second unit comprises T second receivers $(R_{2q})_{q=1\ldots T}$, where T is a whole number equal to or greater than 2, such that N=2T-1. Each second receiver $R_{2q}$ is capable of being connected in an alternating manner to two different sensors $C_{2k}$ via an associated switch, with the exception of one of the second receivers, which is connected to a single second sensor.

Figure 6:
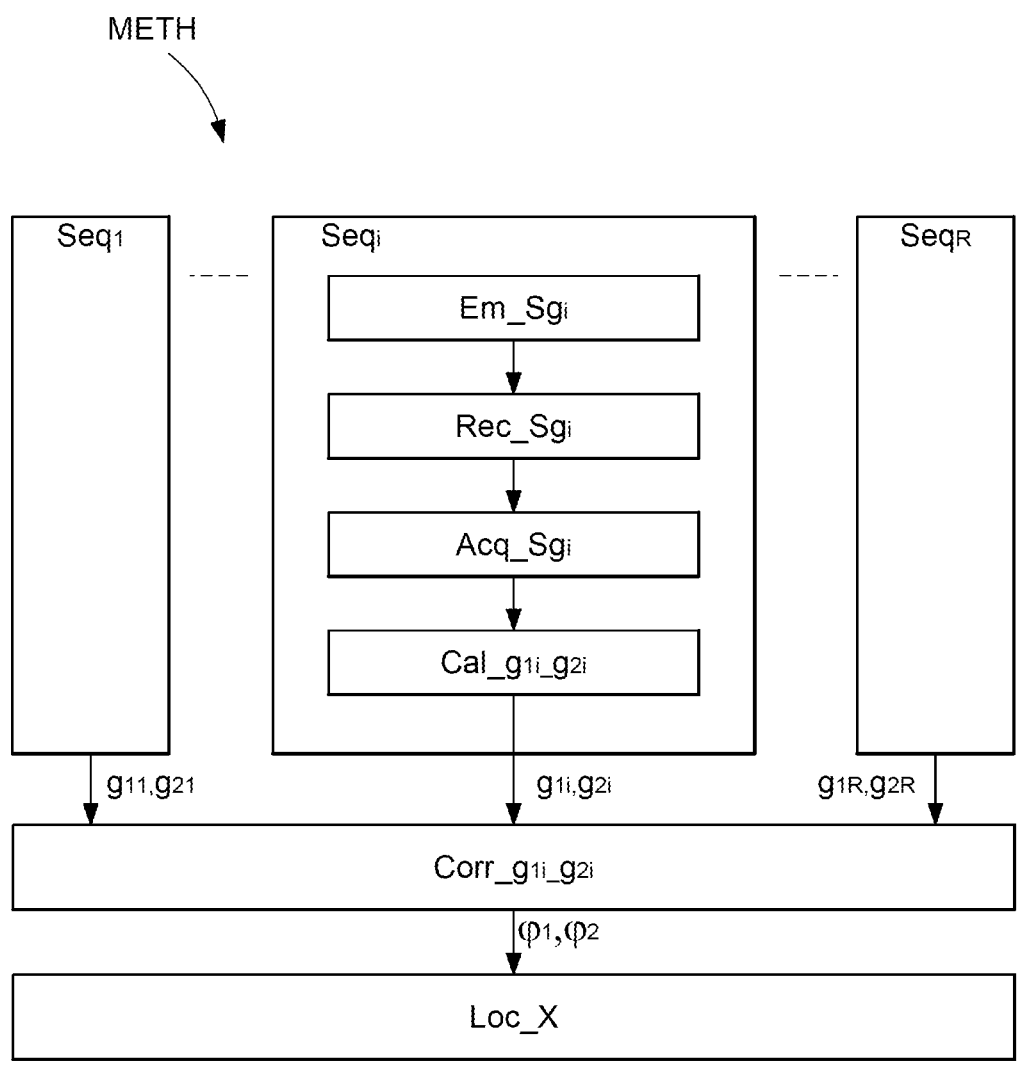
FIG. 6 shows a block diagram of steps in a method for the location of the beacon according to one form of embodiment of the invention.
Figure 7:
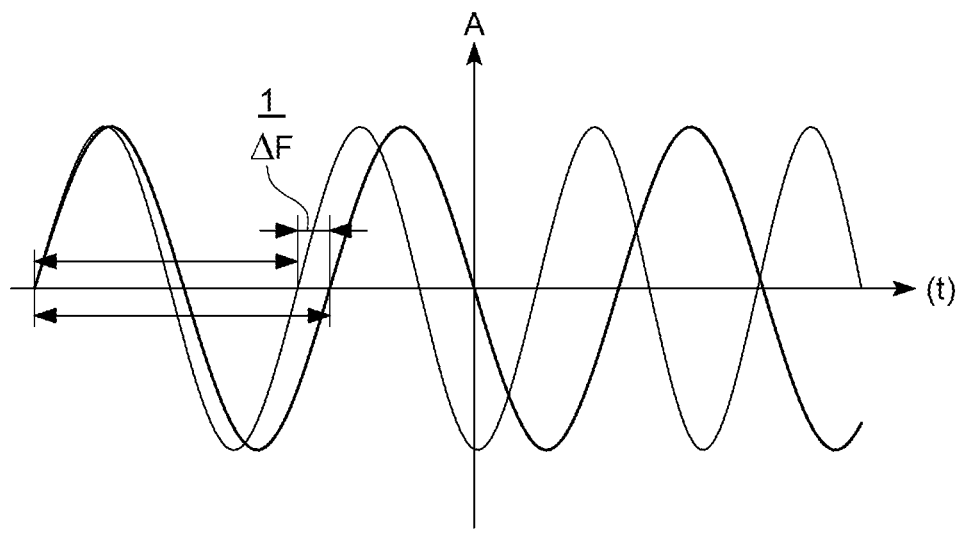
FIG. 7 shows estimation of a frequency drift.
Figure 8:
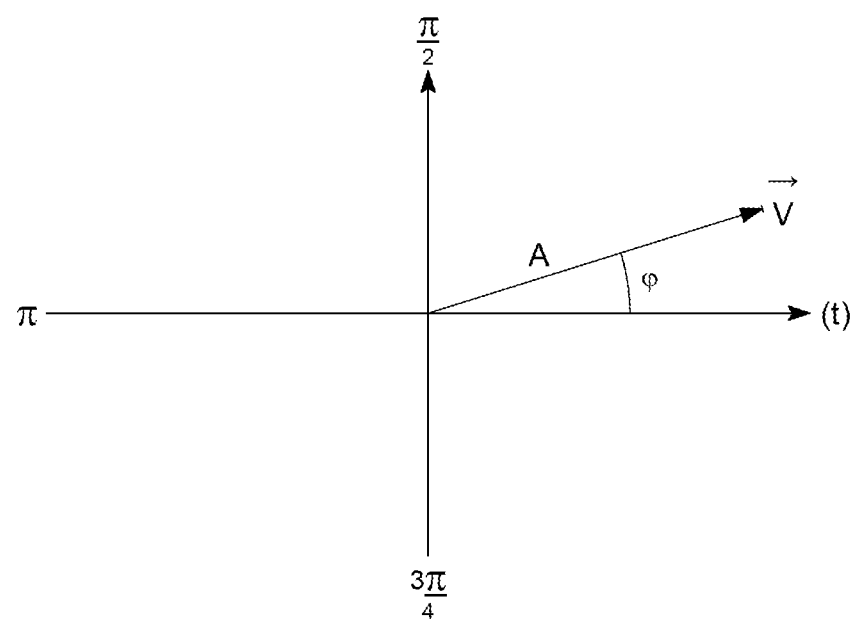
FIG. 8 shows generation of a vector comprising an amplitude and a phase based on the estimated frequency drift.

FIG. 6 represents the steps of a method METH for the location of the beacon X, according to a non-limiting embodiment of the invention. The method comprises a succession of R sequences $(Seq_i)_{i=1\ldots R}$, wherein each sequence $Seq_i$ comprises the steps described hereinafter.

According to a step $Em\_Sg_i$ in the sequence $Seq_i$, the beacon X emits a signal $Sg_i$ of wavelength $\lambda_i$. The wavelengths $(\lambda_i)_{i=1\ldots R}$ of the R signals $(Sg_i)_{i=1\ldots R}$ in the R sequences $(Seq_i)_{i=1\ldots R}$ are all different. The wavelengths $(\lambda_i)_{i=1 \ldots R}$ are advantageously selected from the same order of magnitude as the conventional dimensions of the reflective elements in the environment in which beacon X is located. In an interior environment, for example, a signal $Sg_i$ of frequency 2.4 GHz is appropriate, as its wavelength of 12.5 centimeters is likely to correspond to the dimensions of certain objects in this environment. The signals $(Sg_i)_{i=1 \ldots R}$ are, for example, continuous wave pulses, whether modulated or unmodulated.

According to a step Rec_$Sg_i$ in the sequence $Seq_i$, the signal $Sg_i$ is captured by the first sensors $(C_{1j})_{j=1 \ldots M}$ of the first antenna network $A_1$ and by the second sensors $(C_{1k})_{1=1 \ldots N}$ of the second antenna network $A_2$.

According to a step Acq_$Sg_i$ in the sequence $Seq_i$, acquisition of the signal Sgi is executed by the first receivers $(R_{1p})_{p=1 \ldots S}$ and the second receivers $(R_{2q})_{q=1 \ldots T}$, connected respectively to the first antenna network $A_1$ and to the second antenna network $A_2$. Initially, the switches associated with the first receivers $(R_{1p})_{p=1 \ldots S}$ are configured such that the S first receivers $(R_{1p})_{p=1 \ldots S}$ are connected to S first sensors $(C_{1v})_{v=1 \ldots S}$ of the M first sensors $(C_{1j})_{j=1 \ldots M}$. Likewise, initially, the switches associated with the second receivers $(R_{2q})_{q=1 \ldots T}$ are configured such that T second receivers $(R_{2q})_{q=1 \ldots T}$ are connected to T second sensors $(C_{2v})_{v=1 \ldots T}$ of the N second sensors $(C_{2k})_{k=1 \ldots N}$.

The acquisition step Acq_$Sg_i$ comprises a first phase Ph1 in which each first receiver $R_{1p}$ acquires the signal $Sg_i$ captured by the first receiver $C_{1v}$ to which it is connected, and each second receiver $R_{2q}$ acquires the signal $Sg_i$ captured by the second receiver $C_{2v}$ to which it is connected.

Thereafter, the position of the switches associated with the first receivers $(R_{1p})_{p=1 \ldots S}$ and of the switches associated with the second receivers $(R_{2q})_{q=1 \ldots T}$ is modified. The first receivers $(R_{1p})_{p=1 \ldots S}$ are thus connected to S other first sensors $(C_{1w})_{w=1 \ldots S}$ of the M first sensors $(C_{1j})_{j=1 \ldots M}$, and the second receivers $(R_{2q})_{q=1 \ldots T}$ are thus connected to T other second sensors $(C_{2w})_{w=1 \ldots T}$ of the N second sensors $(C_{2k})_{k=1 \ldots N}$. Only one first sensor remains connected to the same first receiver, and one second sensor remains connected to the same second receiver.

Thereafter, the acquisition step Acq_$Sg_i$ comprises a second phase Ph2 in which each first receiver $R_{1p}$ acquires the signal $Sg_i$ captured by the first receiver $C_{1w}$ to which it is connected, and each second receiver $R_{2q}$ acquires the signal $Sg_i$ captured by the second receiver $C_{2w}$ to which it is connected.

Any sensors not used during the first acquisition phase and the second acquisition phase must be connected to 50-ohm resistors, in order to prevent the behavior thereof as reflectors, thereby distorting the radiation pattern of the other sensors.

As explained above, each acquisition of a signal $Sg_i$ of frequency $f_i$ originating from the beacon X comprises the following:
- a parallel mixing of the signal $Sg_i$ with two quadrature signals of frequency $f_p$, in order to obtain components at frequencies $f_i$, $f_p$ and $f_i+f_p$, and one component at an "intermediate" frequency $|f_i-f_p|$,
- filtering of components by a polyphase filter, in order to remove components at frequencies $f_i$, $f_p$ and $f_i+f_p$, and retain only the component at the intermediate frequency, which is lower than the initial frequency $f_i$ of the signal $Sg_i$, and
- an analog-to-digital conversion of the component at the intermediate frequency, in order to generate a series of samples.

According to a step Cal_$g_{1i}$_$g_{2i}$ in the sequence $Seq_i$, a first estimation function $g_{1i}$ for angles of arrival of the signal $Sg_i$ on the first antenna network $A_1$, and a second estimation function $g_{2i}$ for angles of arrival of the signal $Sg_i$ on the second antenna network $A_2$, are calculated. These functions are generated from the generated samples, for example, by means of the above-mentioned MUSIC algorithm or a Beamforming Spatial Filtering algorithm.

It will observed that the Beamforming Spatial Filtering algorithm requires, as parameters, vectors comprising the phase and amplitude of each of the signals captured by the sensors of an antenna network. In one form of embodiment, in which the Beamforming Spatial Filtering algorithm is employed for the calculation of the estimation functions, each acquisition of a signal $Sg_i$ therefore comprises a step for the generation of a vector comprised of a phase and amplitude of the signal $Sg_i$ received.

In one form of embodiment, the phase and amplitude of the received signal $Sg_i$ are calculated by the application of a Fourier transform to the series of samples. The Fourier transform indeed permits the acquisition of a frequency spectrum for phase and a frequency spectrum for the amplitude of a signal. Naturally, in these frequency spectra, the ray corresponding to the signal Sgi must be distinguished from noise. However, if the local oscillators of the receivers and the local oscillator of the beacon are of limited stability, they are likely to show a mutual frequency drift. Acquisition of a signal $Sg_i$ by a receiver thus comprises a step for the estimation of the frequency drift between said receiver and the beacon X, preceding the step for the generation of the phase and amplitude vector. Identification of this drift permits the accurate location of the ray corresponding to the signal in the frequency spectra for phase and amplitude.

Thereafter, the method METH comprises, further to the R sequences $(Seq_i)_{i=1 \ldots R}$, a step Corr_$g_{1i}$_$g_{2i}$ for the correlation of the R first estimation functions $(g_{1i})_{i=1 \ldots R}$, and for the correlation of the R second estimation functions $(g_{2i})_{i=1 \ldots R}$. Correlation of the R first estimation functions $(g_{1i})_{i=1 \ldots R}$ permits the determination of a first angle $\varphi_i$ between the beacon X and the first network $A_1$, whereas correlation of the R second estimation functions $(g_{2i})_{i=1 \ldots R}$ permits the determination of a second angle $\varphi_2$ between the beacon X and the second network $A_2$. A correlation is executed, for example, by the calculation, for each angle of a plurality of angles, of a mean for the probabilities associated with said angle by the estimation functions. The angle with the highest mean is thus the angle between the beacon X and the network considered. Indeed, the first estimation functions $(g_{1i})_{i=1 \ldots R}$ all feature a spike corresponding to the first angle $\varphi_1$, whereas the second estimation functions $(g_{2i})_{i=1 \ldots R}$ all feature a spike corresponding to the second angle $\varphi_2$.

Finally, the method comprises a step Loc_X for the location of the beacon X, from the first angle $\varphi_1$ and the second angle $\varphi_2$.

From the above description, a number of variants of the method and device for the location of a beacon can be inferred by a person skilled in the art, without departing from the scope of the invention defined by the claims.

The invention claimed is:

1. A method for locating a beacon, comprising:
executing R sequences, wherein R is a whole number equal to or greater than 2, each R sequence comprising:
receiving by a first antenna network and a second antenna network a signal originating from the beacon, wherein the signals of the R sequences are of different wavelengths and are reflected differently by reflective elements in their path based on interactions between the reflective elements and the different wavelengths, and wherein the first antenna network and the second antenna network each include receivers and sensors;

calculating a first estimation function for angles of arrival of the signal on the first antenna network and of a second estimation function for angles of arrival of the signal on the second antenna network;

mutually correlating the R first estimation functions and the R second estimation functions, for determining a first angle between the beacon and the first network, and a second angle between the beacon and the second network, respectively;

acquiring, for the signal and by each of the receivers connected to the sensors of the first antenna network, the acquiring comprising:
- a first phase for acquisition of the signal captured by a first plurality of the sensors, and
- a second phase for acquisition of the signal captured by a second plurality of the sensors,
- wherein, the acquiring includes, keeping only one of the receivers connected to the same sensor during the first phase for acquisition and the second phase for acquisition; and locating the beacon from the first angle and the second angle determined during the mutually correlating.

2. A device for locating a beacon, comprising:
a first antenna network and a second antenna network configured to receive R signals with distinct carrier frequencies, the R signals being reflected differently by reflective elements in their path based on sizes of the reflective elements relative to different wavelengths of the R signals, the R signals originating from the beacon; and acquisition and calculation circuitry configured to: calculate estimation functions for angles of arrival of the signals on the first antenna network and on the second antenna network, correlate the estimation functions to determine a first angle between the beacon and the first network, and a second angle between the beacon and the second network; and locate the beacon from the first angle and the second angle, the acquisition and calculation circuitry comprising: first receivers connected to sensors on the first antenna network, the first receivers being configured to acquire the signals captured by the sensors to which they are connected, and at least one switch configured to connect a first plurality of the sensors during a first phase for the acquisition of a signal, and a second plurality of the sensors during a second phase for the acquisition of the signal, wherein only one of the first receivers is connected to the same sensor during the first phase and the second phase for the acquisition of the signal.

* * * * *